United States Patent [19]

Klaussner

[11] Patent Number: 4,796,491

[45] Date of Patent: Jan. 10, 1989

[54] APPARATUS FOR STRIPPING ELECTRICAL CONDUCTORS

[76] Inventor: Hans-Jurgen Klaussner, Via Lungo Lago 2-4 (XXV) 25.aprile, I-21037 Lavena/Ponte Tresa, Italy

[21] Appl. No.: 53,748

[22] Filed: May 26, 1987

[30] Foreign Application Priority Data

May 31, 1986 [CH] Switzerland .......................... 0202/86

[51] Int. Cl.⁴ ............................................. H02G 1/12
[52] U.S. Cl. ..................................................... 81/9.51
[58] Field of Search .......................................... 81/9.51

[56] References Cited

U.S. PATENT DOCUMENTS 4,185,522 1/1980 Reinertz et al. ..................... 81/9.51

Primary Examiner—Roscoe V. Parker

Attorney, Agent, or Firm—Burns, Doane, Swecker & Mathis

[57] ABSTRACT

Apparatus for stripping insulation from electrical conductors is described. The setting of the values for the stripping length and depth is carried out on a stripping unit of the apparatus. Cam paths and slideways operated by means of a roll with ram are provided and are in operative connection with an insulation removal means. A drive unit acts on a roll with ram in such a way that the latter is guided by means of sliders vertically movable between two vertical guides and that laterally of slider is provided a transmission lever with slideway for operating the stripping apparatus formed from two knife parts. A lever operated by a roll is provided on cam path for operating the insulation removal means. Stripping unit and conductor clamping unit can be operated by drive unit by means of separate drive lines or phases, the values necessary for stripping being set exclusively on stripping unit independently of the drive.

7 Claims, 3 Drawing Sheets

APPARATUS FOR STRIPPING ELECTRICAL CONDUCTORS

FIELD OF THE INVENTION

The present invention relates generally to an apparatus for stripping electrical conductors.

BACKGROUND OF THE INVENTION

In known stripping apparatuses the cutting and removal of conductor insulation takes place by means of feed and cutting devices located on a movable drive part. It is necessary in such devices to correspondingly adjust the stripping unit for each conductor and plug type, particular accuracy being required when establishing the cutting position of the conductor to be stripped with respect to the prepared plug.

Work is very time-consuming and often involves a tool change, it being in particular necessary to bring out coincidence between the settings of the stripping apparatus and the settings of the actuating parts of the drive.

It would be beneficial to provide an apparatus requiring only a single setting of the values necessary for stripping, so that high precision is ensured in the case of a simultaneous significant reduction in the conversion times.

OBJECTS AND SUMMARY OF THE INVENTION

It is an object of the present invention to provide an apparatus which solves the above-mentioned problems.

One advantage of the invention is in particular that a conductor clamping unit and a stripping unit are operable by a single drive unit via separate drive lines or phases and the values necessary for stripping are set exclusively on the stripping unit and independently of the drive.

By locking the lower clamping jaw by means of a lever operated by a lifting magnet and by opening the movable part of the stripping knife by means of a transmission lever and the action of a pawl, it is possible to make ready the conductor clamping unit and the stripping unit.

On initiating the next stripping process by a device, e.g. a light barrier or an electronic component, the lever and pawl are released by means of the lifting magnet.

BRIEF DESCRIPTION OF THE DRAWING

An embodiment of the invention is described hereinafter relative to the drawing, wherein.

Figure 1:
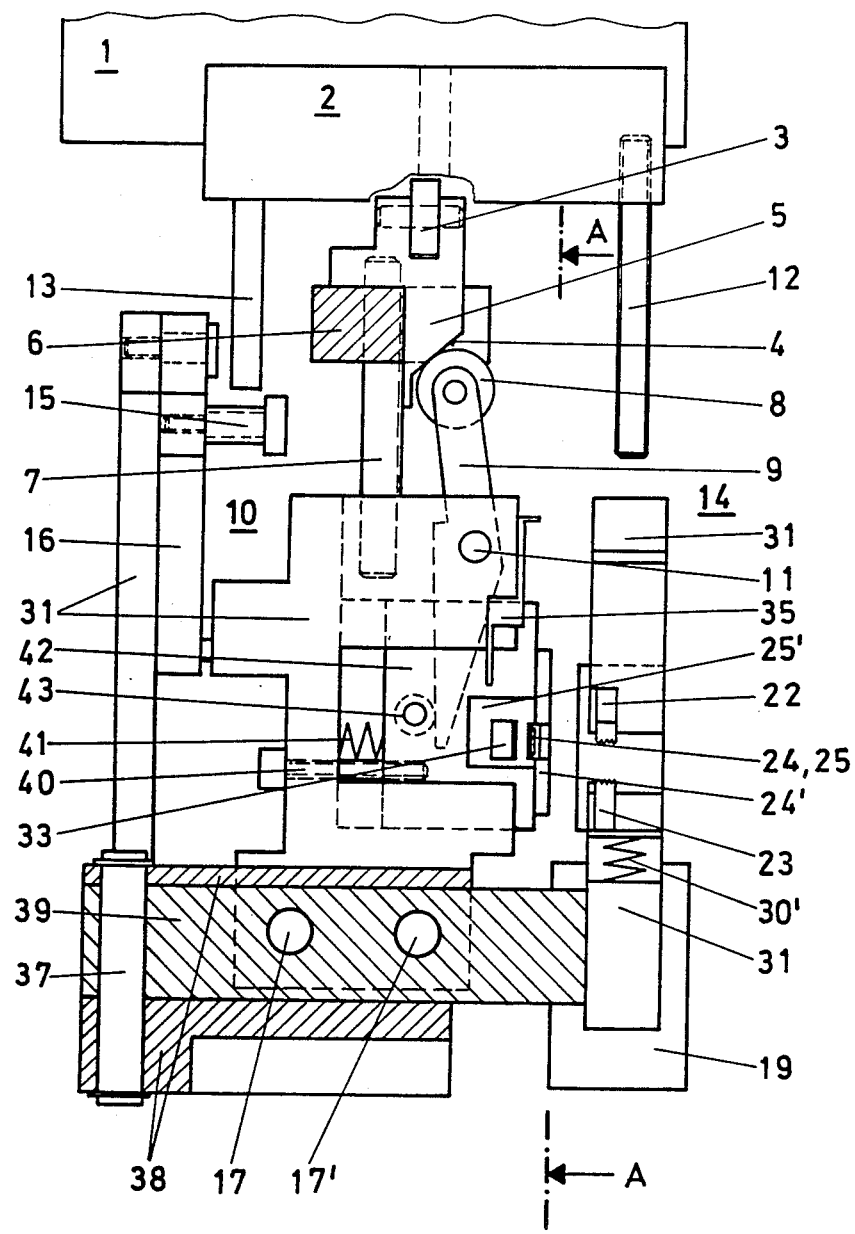
FIG. 1 is a side view of the inventive apparatus.

The sequence of the drawings need not coincide with the movement sequence of the inventive apparatus. The specific technical description is mainly based on constructional considerations.

DETAILED DESCRIPTION OF A PREFERRED EMBODIMENT

According to FIGS. 1 to 3, 31 is a casing, which receives a conductor clamping unit 14 and a stripping unit 10 with insulation removing means 24, 24', 25, 25', 33, 34, 35, 40, 41, 42, 43.

There is a drive connection between the apparatus and a per se known drive unit, e.g. a crimping press 1, 2. Drive unit 1, 2 acts on a roll 3 with ram 5, whose end remote from roll 3 is constructed as a cam path 4. The ram is fixed between two sliders 6, 6', which are guided on vertical guides 7, 7'. A further roll 8 with a lever 9 movably located thereon and mounted in a fulcrum 11 acts on cam path 4, the values of the latter being transmitted to an insulation removal means 42, 43, in that the lever end 9 opposite to roll 8 is pressed counter to the force of a compression spring 41 onto an actuating cam 43 of insulation removal means 42, 43.

By means of a push rod 12, drive unit 1, 2 drives the conductor clamping unit 14 with clamping jaws 22, 23 and via a push rod 13 and a roll 15 with pivoted lever 16 for moving the complete stripping unit 10 outside the crimping zone for eliminating insulation residues. The lateral extension of stripping unit 10 takes place by means of guide rails 17, 17' and return springs 18', which at the end of the stripping process permit an automatic return of the stripping unit 10 to its original position.

Figure 2:
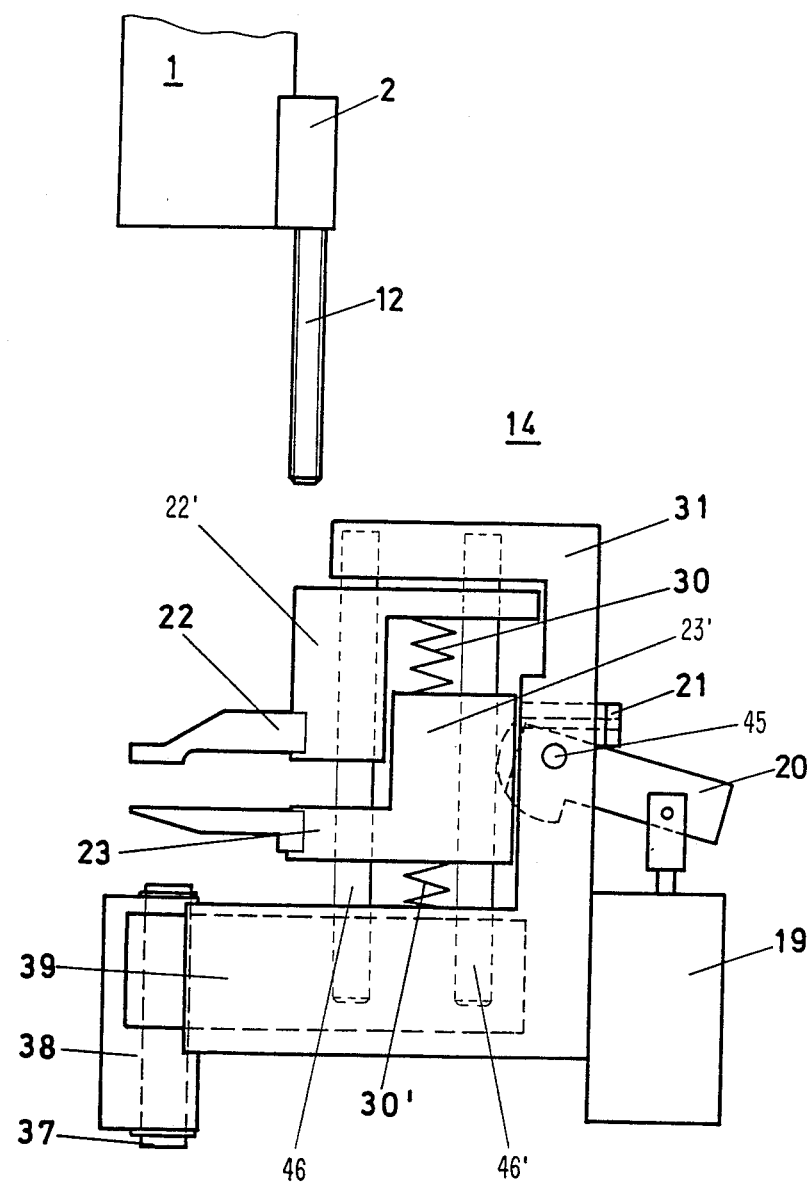
FIG. 2 is a front view of a conductor clamping unit of the apparatus according to FIG. 1.
Figure 3:
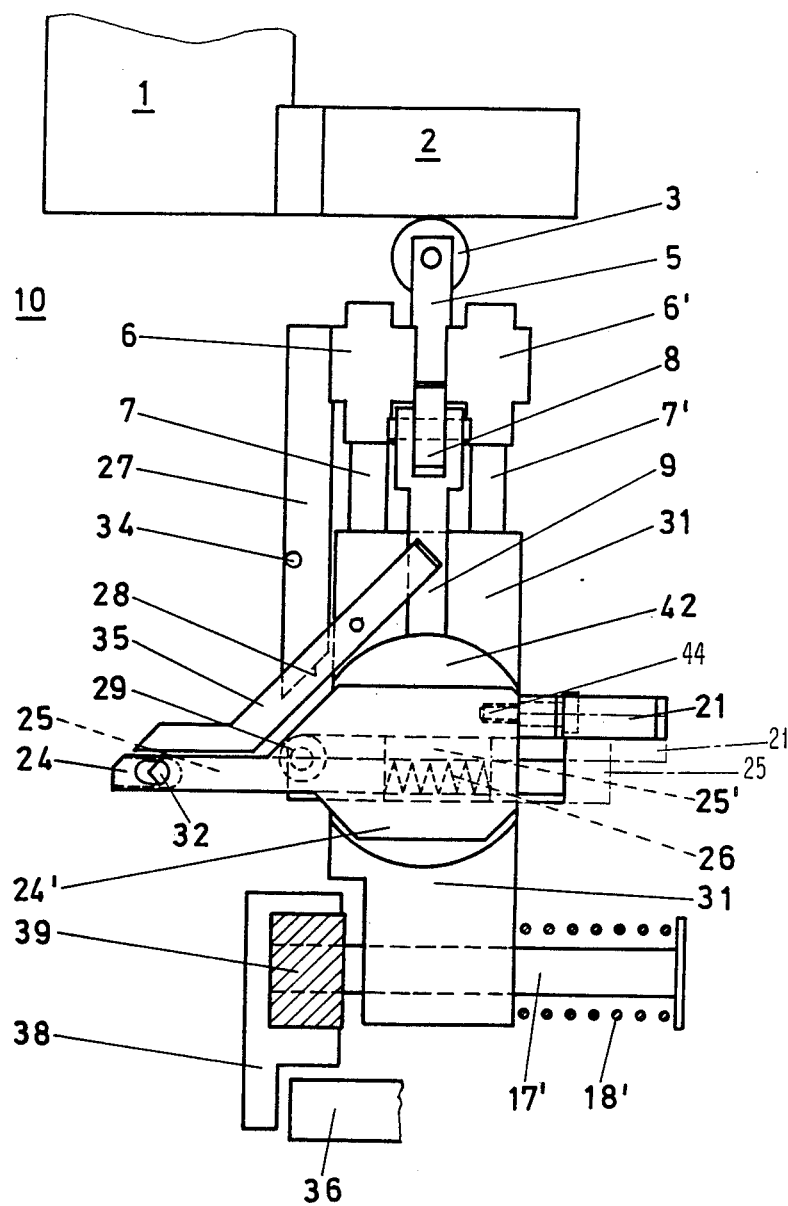
FIG. 3 is a sectional view along line A—A of FIG. 1.
Figure 4A:
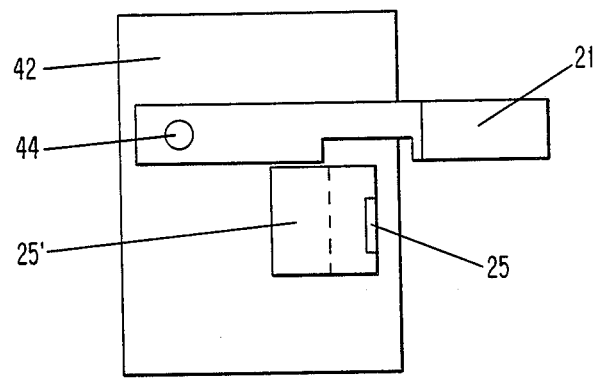
FIGS. 4a and 4b are side view of the stripping unit in accordance with the invention wherein the locking movement of a blade holder locking pawl is shown.
Figure 4B:
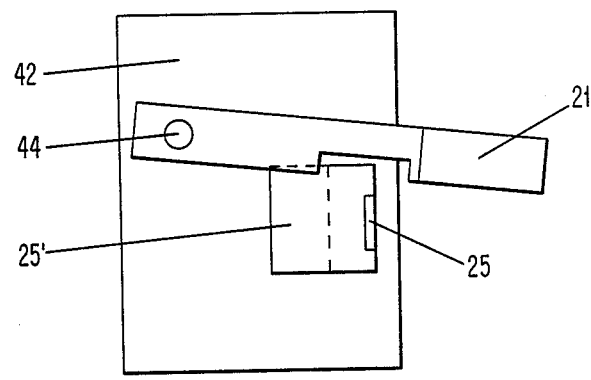

There is also a lifting magnet 19, whose forked armature is connected to a lever 20 mounted in rotary manner around a point of rotation 45 and on which engages a locking pawl 21. The locking pawl 21 is Z-shaped and is rotatable around a point of rotation 44 so that when the lever 20 rotates around the point 45, the locking pawl rotates around the point 44. When in a position as shown in FIG. 2, the pawl 21 engages the movable knife part 25 and the lever 20 simultaneously engages the lower clamping jaw 23 so that the jaw 23 is locked by means of the lever 20 counter to the force of a spring 30' through the pressure of push rod 12 on a clamping jaw mounting support 22'. In the lower part of casing 31 are provided knife supports 24', 25' with a fixed and a movable knife part 24, 25 arranged in such a way that the movable knife part 25 cooperates by means of a return spring 26 with pawl 21, the movable knife part 25 being kept in the open position by pawl 21 counter to the force of return spring 26. The operation of the movable knife part 25 takes place by means of a transmission lever 27, which is connected to slider 6 and whose other end is constructed as a slideway 28 and can act on a cam 29 of knife support 25'.

The conductor clamping unit 14 is operated by means of the push rod 12 of drive unit 1, 2, which presses on the upper clamping jaw mounting support 22' in opposition to the force of a spring 30 and therefore on the lower clamping jaw mounting support 23' in opposition to the force of spring 30'. As has already been stated, the lower clamping jaw 23 is locked or released by means of the lever 20 of lifting magnet 19, i.e. the clamping jaws 22, 23 are opened or closed.

The apparatus functions as follows. By inserting a conductor end between the clamping jaws 22, 23 opened in accordance with FIG. 2 and open knife parts 24, 25 forming an opening 32, a signal is emitted by a preferably electronic device, such as a sensor 33, so that lifting magnet 19 unlocks lever 20 and simultaneously pawl 21. As a result clamping jaws 22, 23 and the movable knife part 25 close, so that the conductor is secured and it is possible to cut its insulation to a predetermined depth. Following a short delay, the drive unit 1, 2 actuates roll 3 with ram 5 and the cut conductor insulation is removed by the insulation removal means 42, 43 (to the left in FIG. 1) operated by means of roll 8 with lever 9 in opposition to the tension of a spring 41. Push rod 13 of drive unit 1, 2 then acts on roll 15, so that the pivoted lever 16 extends the complete stripping unit 10 out of the crimping zone in opposition to the force of compression springs 18'. Simultaneously the knife support 25' with the movable knife part 25 is opened by means of the slideway 28 of transmission lever 27 via an actuating cam 29. During the opening movement of knife part 25 an ejection lever 35 moves the separated piece of conductor insulation into a container 36 through the abutment of a pin 34 located on transmission lever 27.

In the bottom dead center of drive unit 1, 2, the clamping jaws 22, 23 are forced downwards by push rod 12, in the manner described hereinbefore and are locked by lifting magnet 19 with lever 20. By raising the lifting member 2 of drive unit 1 the apparatus is returned to its initial position, i.e. that of being ready for receiving the next conductor to be stripped and the previously described process is repeated.

For adjustment and tool changing operations, it is possible to laterally swing out the complete apparatus by means of a bolt 37, which traverses a base plate 38 and a fixing plate 39, which simplifies accessibility to the setting means. For adjusting the cut-off length of the conductor insulation, the apparatus carries a setscrew 40, so that it is possible to universally use the most varied conductor types.

While this invention has been illustrated and described in accordance with a preferred embodiment, it is recognized that variations and changes may be made and equivalents employed herein without departing from the invention as set forth in the claims.

What is claimed is:

1. Apparatus for stripping insulation from electrical conductors comprising:
    a fixed casing;
    a first movable machine part and a second movable machine part mounted on said fixed casing;
    said first machine part including a conductor clamping unit;
    said second movable machine part including a stripping unit with means for removing a desired length and depth of insulation from the conductor;
    a drive unit having actuating means for actuating said conductor clamping unit and said stripping unit; and
    drive transmission means for transmitting drive from the drive unit to the second movable machine part, the drive transmission means including at least one slider provided with a first cam surface, a cam follower in contact with the first cam surface, and a ram having a first roll mounted thereon and being movable to operate the slider, the cam follower being movable on the first cam surface to actuate the second movable machine part.

2. The apparatus in accordance with claim 1, wherein said stripping unit further includes two vertical guides on which the at least one slider is vertically movable, said slider supporting said first roll, said ram and a transmission lever on which a second cam surface is provided, and two knife parts at least one of which is operated by said second cam surface.

3. The apparatus in accordance with claim 2, wherein said cam follower includes a lever having a second roll thereon, said second roll being operated on by said first cam surface to move said lever thus driving insulation removing means for removing insulation from the conductor.

4. The apparatus in accordance with claim 1, wherein said stripping unit further includes a knife support on which a movable knife is supported, a return spring, and a pawl for locking said movable knife from movement.

5. The apparatus in accordance with claim 1, wherein said casing further includes guide rails on which said stripping unit is supported in a laterally extendable manner and biasing means for urging said stripping unit toward one end of said guide rails, said stripping unit being driven along said guide rails by a pivoted lever operably connected thereto, said pivoted lever having a third roll mounted thereon which is driven by said actuating means.

6. The apparatus in accordance with claim 1, wherein said conductor clamping unit includes resiliently mounted upper and lower clamping jaws which are drivable by said actuating means.

7. The apparatus in accordance with claim 6, wherein said conductor clamping unit further includes a lever rotatably mounted adjacent said lower clamping unit, and a lifting magnet for driving said lever so as to lock or unlock said clamping jaws.

* * * * *